(12) United States Patent
Lian et al.

(10) Patent No.: US 12,449,937 B2
(45) Date of Patent: Oct. 21, 2025

(54) DISPLAY PANEL INCLUDING SHIELDING STRUCTURE WITH FLOATING POTENTIAL, AND DISPLAY DEVICE

(71) Applicant: HUIZHOU CHINA STAR OPTOELECTRONICS DISPLAY CO., LTD., Guangdong (CN)

(72) Inventors: Zhengqin Lian, Shenzhen (CN); Ru Ge, Shenzhen (CN); Lixia Li, Shenzhen (CN); Ying Lu, Shenzhen (CN)

( * ) Notice: Subject to any disclaimer, the term of this patent is extended or adjusted under 35 U.S.C. 154(b) by 0 days.

(21) Appl. No.: 17/790,768

(22) PCT Filed: Jul. 4, 2022

(86) PCT No.: PCT/CN2022/103643
§ 371 (c)(1),
(2) Date: Jul. 5, 2022

(87) PCT Pub. No.: WO2023/236297
PCT Pub. Date: Dec. 14, 2023

(65) Prior Publication Data
US 2025/0085810 A1    Mar. 13, 2025

(30) Foreign Application Priority Data

Jun. 8, 2022  (CN) .......................... 202210647934.9

(51) Int. Cl.
*G06F 3/041*    (2006.01)
(52) U.S. Cl.
CPC ........ *G06F 3/04182* (2019.05); *G06F 3/0412* (2013.01); *G06F 2203/04107* (2013.01)

(58) Field of Classification Search
CPC ............... G06F 3/04182; G06F 3/0412; G06F 2203/04107; G09G 2330/06
See application file for complete search history.

(56) References Cited

U.S. PATENT DOCUMENTS

| | | | |
|---|---|---|---|
| 2011/0169769 A1 | 7/2011 | Takahashi | |
| 2014/0139239 A1* | 5/2014 | Zachut | G06F 3/0448 324/658 |
| 2016/0291746 A1 | 10/2016 | Kim | |

(Continued)

FOREIGN PATENT DOCUMENTS

| | | |
|---|---|---|
| CN | 102621729 A | 8/2012 |
| CN | 103513479 A | 1/2014 |

(Continued)

OTHER PUBLICATIONS

International Search Report in International application No. PCT/CN2022/103643, mailed on Dec. 29, 2022.

(Continued)

*Primary Examiner* — Roberto W Flores

(57) ABSTRACT

A display panel and a display device are provided. By means of a shielding structure with a floating potential provided over a projection of a sensing read line, when an electrical signal is transmitted on the sensing read line and a pixel data line, a shielding electric field will be formed between the shielding structure and the sensing read line. The presence of the shielding electric field can reduce capacitance between the sensing read line and adjacent pixel data line and effectively improve a signal-to-noise ratio during signal transmission.

17 Claims, 3 Drawing Sheets

(56) References Cited

U.S. PATENT DOCUMENTS

| | | | |
|---|---|---|---|
| 2019/0187831 A1* | 6/2019 | Liu | G06F 3/0443 |
| 2021/0278920 A1* | 9/2021 | Tang | H10K 59/126 |
| 2022/0206606 A1* | 6/2022 | Ye | G06F 3/0443 |
| 2023/0245491 A1* | 8/2023 | Nathan | H01L 27/1446 |
| | | | 382/124 |
| 2023/0350516 A1* | 11/2023 | Wang | H10K 59/131 |

FOREIGN PATENT DOCUMENTS

| | | | |
|---|---|---|---|
| CN | 105870105 A | | 8/2016 |
| CN | 111047969 A | | 4/2020 |
| CN | 112711349 A | | 4/2021 |
| CN | 112768495 A | | 5/2021 |
| CN | 113157134 A | | 7/2021 |
| CN | 113284911 A | | 8/2021 |
| CN | 113555399 A | | 10/2021 |
| CN | 114596780 A | * | 6/2022 |

OTHER PUBLICATIONS

Written Opinion of the International Search Authority in International application No. PCT/CN2022/103643, mailed on Dec. 29, 2022.

Chinese Office Action issued in corresponding Chinese Patent Application No. 202210647934.9 dated Jun. 5, 2025, pp. 1-8.

\* cited by examiner

DISPLAY PANEL INCLUDING SHIELDING STRUCTURE WITH FLOATING POTENTIAL, AND DISPLAY DEVICE

BACKGROUND OF INVENTION

Field of Invention

The present invention generally relates to a technical field of displays, and particularly to a display panel and a display device.

Related Art

With ever-changing development of electronic technology, more and more scenarios in life require the use of display devices, which generally include display panels.

Based on the foregoing, how to ensure reliability of signal transmission in display panels is an imperative issue at present.

SUMMARY OF INVENTION

An object of present invention is to provide a display panel and a display device to solve a problem that, for example, a relatively large capacitance occurs between a sensing read line and an adjacent pixel data line due to a short distance between them, thus adversely affecting a signal-to-noise ratio during signal transmission.

In a first aspect, the present invention provides a display panel, at least including a substrate including a fan-out area; a wiring layer disposed on the substrate and located in the fan-out area and at least comprising a sensing read line and a plurality of pixel data lines arranged in a regular manner with the sensing read line; and a shielding structure disposed in a layer different from the wiring layer. An orthographic projection of the shielding structure on the substrate covers an orthographic projection of the sensing read line on the substrate, and the shielding structure has a floating potential.

According to the display panel in one embodiment of the present invention, the display panel further includes a plurality of dummy signal lines disposed in the fan-out area and located between the sensing read line and the pixel data lines respectively. Potentials of the dummy signal lines are set to be floating.

According to the display panel in one embodiment of the present invention, the dummy signal lines comprise a first dummy signal line and a second dummy signal line, and the first dummy signal line and the second dummy signal line are symmetrically arranged on both sides of the sensing read line.

According to the display panel in one embodiment of the present invention, the orthographic projection of the shielding structure on the substrate further covers orthographic projections of the dummy signal lines on the substrate, and the orthographic projection of the shielding structure on the substrate further covers orthographic projections of spacings between the dummy signal lines and the sensing read line on the substrate.

According to the display panel in one embodiment of the present invention, widths of the sensing read line, the pixel data lines, and the dummy signal lines are equal, and/or the sensing read line, the pixel data lines, and the dummy signal lines are arranged at equal intervals.

According to the display panel in one embodiment of the present invention, the dummy signal lines, the sensing read line, and the pixel data lines are disposed in a same layer.

According to the display panel in one embodiment of the present invention, a first distance is defined between the sensing read line and an adjacent one of the pixel data lines, and a second distance is defined between adjacent ones of the pixel data lines. The first distance is greater than the second distance.

According to the display panel in one embodiment of the present invention, a material of the shielding structure comprises metal or metal oxide.

According to the display panel in one embodiment of the present invention, each of the sensing read lines is coupled to a plurality of sensing unit circuits, and each of the pixel data lines is coupled to a plurality of pixel unit circuits, wherein the sensing unit circuits and the pixel unit circuits are arranged in an array in a display area included in the display panel.

According to the display panel in one embodiment of the present invention, each of the sensing unit circuits is configured to change in capacitance in response to a laser touch, and the sensing read line is configured to obtain the change and reflect the change to a corresponding processing circuit, so that where the laser touch is performed is determined.

In a second aspect, the present invention further provides a display device, including at least the display panel as described above and a backlight source. The backlight source is connected to the display panel for providing backlight to the display panel.

According to the display device in one embodiment of the present invention, the display panel further includes a plurality of dummy signal lines disposed in the fan-out area and located between the sensing read line and the pixel data lines respectively. Potentials of the dummy signal lines are set to be floating.

According to the display device in one embodiment of the present invention, the dummy signal lines comprise a first dummy signal line and a second dummy signal line, and the first dummy signal line and the second dummy signal line are symmetrically arranged on both sides of the sensing read line.

According to the display device in one embodiment of the present invention, the orthographic projection of the shielding structure on the substrate further covers orthographic projections of the dummy signal lines on the substrate, and the orthographic projection of the shielding structure on the substrate further covers orthographic projections of spacings between the dummy signal lines and the sensing read line on the substrate.

According to the display device in one embodiment of the present invention, widths of the sensing read line, the pixel data lines, and the dummy signal lines are equal, and/or the sensing read line, the pixel data lines, and the dummy signal lines are arranged at equal intervals.

According to the display device in one embodiment of the present invention, the dummy signal lines, the sensing read line, and the pixel data lines are disposed in a same layer.

According to the display device in one embodiment of the present invention, a first distance is defined between the sensing read line and an adjacent one of the pixel data lines, and a second distance is defined between adjacent ones of the pixel data lines. The first distance is greater than the second distance.

According to the display device in one embodiment of the present invention, a material of the shielding structure comprises metal or metal oxide.

According to the display device in one embodiment of the present invention, each of the sensing read lines is coupled to a plurality of sensing unit circuits, and each of the pixel data lines is coupled to a plurality of pixel unit circuits. The sensing unit circuits and the pixel unit circuits are arranged in an array in a display area included in the display panel.

According to the display device in one embodiment of the present invention, each of the sensing unit circuits is configured to change in capacitance in response to a laser touch, and the sensing read line is configured to obtain the change and reflect the change to a corresponding processing circuit, so that where the laser touch is performed is determined.

The present invention has advantageous effects as follows: the present invention provides the display panel and the display device. The display panel at least includes the substrate, the wiring layer, and the shielding structure. The substrate is provided with the fan-out area, and the wiring layer is disposed on the substrate and located in the fan-out region. The wiring layer at least includes the sensing read line and the pixel data lines arranged in a regular manner with the sensing read line. The shielding structure and the wiring layer are disposed in different layers. The orthographic projection of the shielding structure on the substrate covers the orthographic projection of the sensing read line on the substrate. The potential of the shielding structure is configured to be floating. Based on the display panel provided by the invention, since the shielding structure is added over the projection of the sensing read line, and the shielding structure is configured to have a floating potential, when an electrical signal is transmitted on the sensing read line and the pixel data line, a shielding electric field will be formed between the shielding structure and the sensing read line. The presence of the shielding electric field can reduce the capacitance between the sensing read line and the adjacent pixel data line, thus effectively improving the signal-to-noise ratio during signal transmission.

BRIEF DESCRIPTION OF DRAWINGS

In order to illustrate the technical solutions of the present invention more clearly, the following briefly introduces the accompanying drawings used in the description of the various embodiments of the present invention. Obviously, the drawings in the following description are only for the present invention. In some embodiments, for those skilled in the art, other drawings can also be obtained based on these drawings without any creative effort.

DESCRIPTION OF PREFERRED EMBODIMENTS

Figure 1:
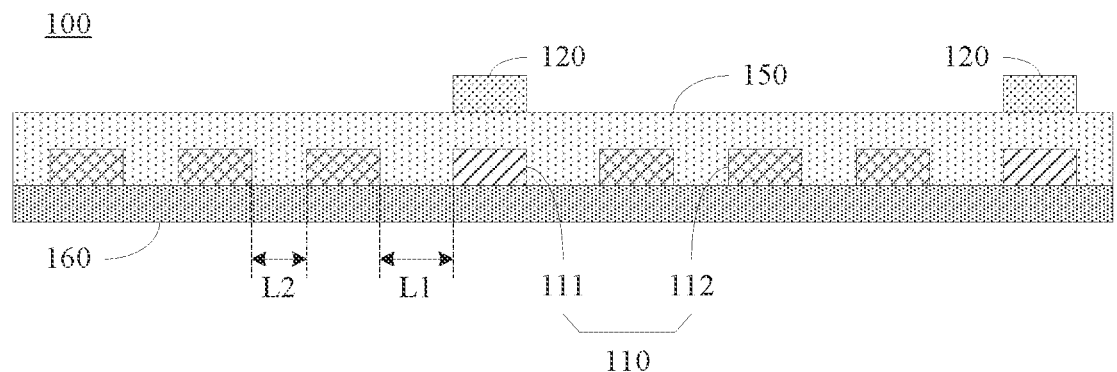
FIG. 1 is a schematic structural diagram of a display panel in a front view provided in a first embodiment of the invention.

The technical solutions in the embodiments of the present invention will be clearly and completely described below in conjunction with the drawings in the embodiments of the present invention. Obviously, the described embodiments are only a part of the embodiments of the present invention, rather than all the embodiments. Based on the embodiments in this invention, all other embodiments obtained by those skilled in the art without creative work shall fall within the protection scope of this invention.

In the description of the present invention, it is to be understood that the term "center", "longitudinal", "lateral", "length", "width", "thickness", "upper", "lower", "front", "rear", "left", "right", "vertical", "horizontal", "top", "bottom", "inner", "outer", "clockwise", "counterclockwise" indicates orientation or the orientation or positional relationship based on the positional relationship shown in the drawings, for convenience of description only and the present application is to simplify the description, but does not indicate or imply that the device or element referred to must have a particular orientation in a particular orientation construction and operation, and therefore not be construed as limiting the present application. In addition, the terms "first" and "second" are only used for descriptive purposes and are not to be construed as indicating or implying relative importance. Thus, features defining "first" or "second" may include one or more of the described features either explicitly or implicitly. In the description of the present invention, the meaning of "a plurality" is two or more unless specifically and specifically defined otherwise.

In the present invention, unless otherwise explicitly specified or limited, the terms "mounted", "linked", "connected", and like terms are to be broadly understood. For example, it may be a fixed connection, a detachably connection, or an integrally connection, or may be a mechanical connection, electrically connection, or a directly connection. Alternatively, it can also be connected indirectly through intervening structures, or may be interaction between the two internal communicating elements or two elements. Those of ordinary skill in the art, to be understood that the specific meanings in the present invention in accordance with specific circumstances.

In the present invention, unless otherwise expressly specified or limited, the first feature being "on" or "below" the second feature may include direct contact of the first and the second features and may also include that the first and the second features are not in direct contact, but in contact by the additional features therebetween. Also, the first feature being "over", "above", "on" the second feature may include that the first feature is directly above and diagonally above the second feature, or simply represent that a level of the first feature is higher than that of the second feature. The first feature being "beneath", "below", and "lower" the second feature may include that the first feature is obliquely downward and right below the second feature, or simply represent that a level of the first feature is less than that of the second feature.

The following disclosure provides many different embodiments or examples for implementing different structures of the present invention. To simplify the disclosure of the present invention, the components and arrangements of specific examples are described below. Of course, they are only examples and are not intended to limit the invention. Furthermore, this invention may repeat reference numerals and/or reference letters in different instances for the purpose of simplicity and clarity, and does not in itself indicate the relationship between the various embodiments-and/or arrangements discussed. Moreover, this invention provides examples of various specific processes and materials, but one of ordinary skill in the art will recognize the application of other processes and/or the use of other materials.

Figure 2:
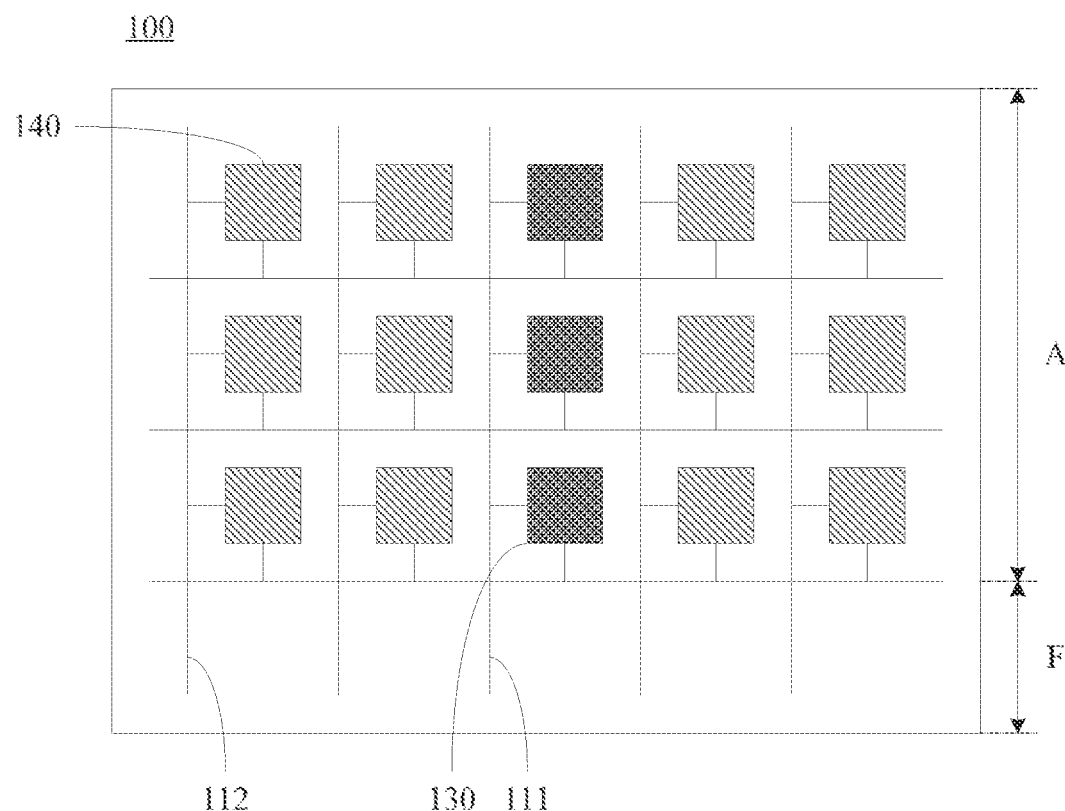
FIG. 2 is a schematic structural diagram of a display panel in a top view provided in the first embodiment of the invention.

Please refer to FIGS. 1 and 2. FIGS. 1 and 2 are schematic structural diagrams of a display panel 100 in a front view and in a top view, respectively, provided in a first embodiment of the invention. The components and the relative positional relationship of each component in the first embodiment according to the present invention can be clearly seen from the figures.

As shown in FIGS. 1 and 2, the display panel 100 at least includes a substrate 160, a wiring layer 110, and a shielding structure 120. Next, each component of the display panel 100 will be described in detail with reference to FIGS. 1 and 2.

The substrate 160 is provided with a display area A and a fan-out area F arranged adjacently. The wiring layer 110 is disposed on the substrate 160 and located in the fan-out area F, and the wiring layer 110 at least includes a sensing read line 111 and a plurality of pixel data lines 112 arranged in a regular manner with the sensing read line 111.

It should be noted that, in the embodiment of the invention, the display panel 100 is an in-plane touch display panel, that is, a sensor unit (sensor) for positioning a touch operation is disposed in the display panel 100. Specifically, a plurality of sensing unit circuits 130 and a plurality of pixel unit circuits 140 are arranged in an array in the display area A of the display panel 100. Each of the sensing read lines 111 is coupled to the sensing unit circuits 130, and each of the pixel data lines 112 is coupled to the pixel unit circuits 140. Further, the sensing read line 111 is configured to locate a touch operation performed by a user according to current in the sensing unit circuits 130 coupled to the sensing read line 111, and the pixel data line 112 is configured to charge the pixel unit circuits 140 coupled to the pixel data line 112 with a received data signal.

The shielding structure 120 and the wiring layer 110 are disposed in different layers and are located in the fan-out area F. Specifically, an orthographic projection of the shielding structure 120 on the substrate 160 covers an orthographic projection of the sensing read line 111 on the substrate 160, and the shielding structure 120 has a floating potential. Further, a dielectric layer 150 is spaced between the shielding structure 120 and the sensing read line 111.

Specifically, a material of the shielding structure 120 may be metal, for example, silver (Ag), aluminum (Al), nickel (Ni), chromium (Cr), molybdenum (Mo), copper (Cu), tungsten (W), titanium (Ti), or a combination of the above materials, or may also be a transparent metal oxide such as indium tin oxide (ITO).

It should be noted that, since the sensing unit circuits 130 are added in the display panel 100 for the in-plane touch display panel, the sensing read lines 111 need to be added in the fan-out area F of the substrate 160 accordingly. In addition, because the fan-out area F of the display panel 100 should not be designed to be too large in size, a distance between the sensing read line 111 and adjacent pixel data line 112 is designed to be closer. Further, since electrical signals transmitted on the sensing read lines 111 and the pixel data lines 112 are different, a relatively large capacitance occurs between the sensing read line 111 and the adjacent pixel data line 112 due to a short distance between them, which will adversely affect a signal-to-noise ratio (SNR) during signal transmission.

Referring back to FIG. 1, in this embodiment, since the shielding structure 120 is added over the projection of the sensing read line 111, and the potential of the shielding structure 120 is configured to float, when an electrical signal is transmitted on the sensing read line 111 and the pixel data line 112, a shielding electric field will be formed between the shielding structure 120 and the sensing read line 111. The presence of the shielding electric field can reduce the capacitance between the sensing read line 111 and the adjacent pixel data line 112, thus effectively improving the signal-to-noise ratio during signal transmission.

Further, please continue to refer to FIG. 1, in this embodiment, as shown in FIG. 1, a first distance L1 is defined between the sensing read line 111 and the adjacent pixel data line 112, and a second distance L2 is defined between adjacent ones of the pixel data lines 112. Specifically, the first distance L1 is greater than the second distance L2. It should be noted that increasing the distance between the sensing read line 111 and the adjacent pixel data line 112 can further improve the capacitance between the sensing read line 111 and the adjacent pixel data line 112, thereby improving the signal-to-noise ratio during signal transmission.

It should be noted that, in other modifications according to the present invention, if the shielding electric field formed between the shielding structure 120 and the sensing read line 111 is sufficient to enable signal transmission with a better signal-to-noise ratio, then, the sensing read line 111 and the pixel data lines 112 can be arranged at equal intervals, and widths of the sensing read line 111 and the pixel data lines 112 can be equal, so as to ensure uniformity of signal transmission in the display panel 100.

It should be noted that, in a modification according to the invention, the sensing read line and the pixel data lines may be arranged at equal intervals, and the width of the sensing read line may be unequal to the width of the pixel data lines. In another modification according to the invention, the sensing read line and the pixel data lines may be arranged at unequal intervals, and the widths of the sensing read line and the pixel data lines may be equal. The invention is not limited to the above-mentioned features and their combinations.

Figure 3:
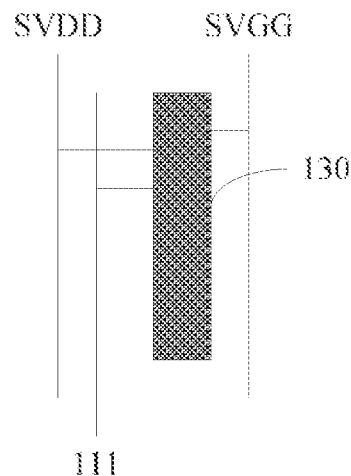
FIG. 3 is a schematic diagram showing a connection relationship of a sensing unit circuit provided in the first embodiment of the invention.

Further, please refer to FIG. 3, which is a schematic diagram showing a connection relationship of the sensing unit circuit 130 provided in the first embodiment of the invention.

The sensing unit circuit 130 is a circuit composed of thin-film transistors (ITFTs). Further, as shown in FIG. 3, the sensing unit circuit 130 is coupled to a first power supply line SVDD, and a second power supply line SVGG is coupled to the sensing read line 111. Specifically, the first power supply line SVDD is configured to apply a driving voltage to the sensing unit circuit 130, and the second power supply line SVGG is configured to apply a fixed voltage to the sensing unit circuit 130. When the sensing unit circuit 130 is touched by, for example, a remote laser, a phototransistor in the sensing unit circuit 130 generates photocurrent, which further changes a capacitance value of a capacitor in the sensing unit circuit 130. The above-mentioned change will be obtained by the sensing read line 111 and reflected in a corresponding processing circuit, and then the processing circuit will locate where the above-mentioned laser touch is performed.

According to the foregoing, the first embodiment of the invention provides the display panel 100. The display panel 100 at least includes the substrate 160, the wiring layer 110, and the shielding structure 120. The substrate 160 is provided with the fan-out area F, and the wiring layer 110 is disposed on the substrate 160 and located in the fan-out region F. The wiring layer 110 at least includes the sensing read line 111 and a plurality of the pixel data lines 112 arranged in a regular manner with the sensing read line 111. The shielding structure 120 and the wiring layer 110 are disposed in different layers. The orthographic projection of the shielding structure 120 on the substrate 160 covers the orthographic projection of the sensing read line 111 on the substrate 160. The potential of the shielding structure 120 is configured to be floating. Based on the display panel 100 provided by the invention, since the shielding structure 120 is added over the projection of the sensing read line 111, and the shielding structure 120 is configured to have a floating potential, when an electrical signal is transmitted on the sensing read line 111 and the pixel data line 112, a shielding electric field will be formed between the shielding structure 120 and the sensing read line 111. The presence of the shielding electric field can reduce the capacitance between the sensing read line 111 and the adjacent pixel data line 112, thus effectively improving the signal-to-noise ratio during signal transmission.

Figure 4:
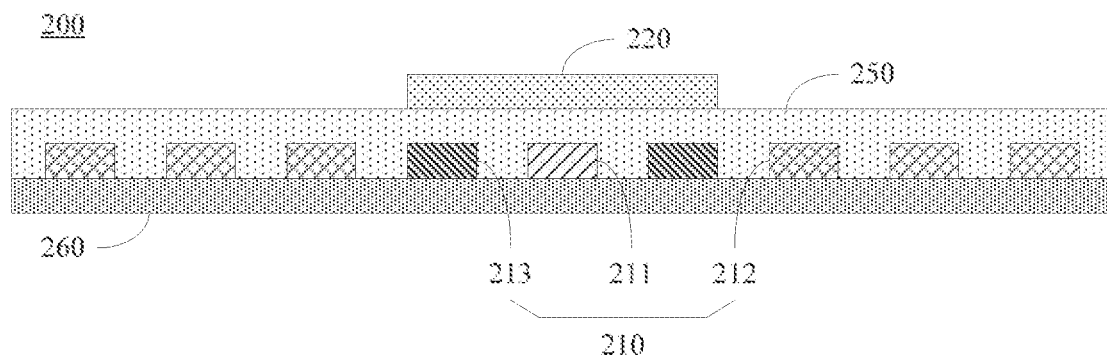
FIG. 4 is a schematic structural diagram of a display panel in a front view provided in a second embodiment of the invention.

Please refer to FIG. 4, which is a schematic structural diagram of a display panel 200 in a front view provided in a second embodiment of the invention. The components and the relative positional relationship of each component in the second embodiment according to the present invention can be clearly seen from the figures.

As shown in FIGS. 1 and 4, the second embodiment and the first embodiment are substantially the same in structure. Specifically, a wiring layer 210 (including a sensing read line 211 and pixel data lines 212), a shielding structure 220, a dielectric layer 250, and a substrate 260 in the second embodiment are the same as the wiring layer 110 (including the sensing read line 111 and the pixel data lines 112), the shielding structure 120, the dielectric layer 150, and the substrate 160 in the first embodiment in their functions and locations.

The difference is that, in this embodiment, the wiring layer 210 of the display panel 200 further includes a plurality of dummy signal lines 213 disposed in the fan-out area F. In addition, the dummy signal lines 213, the sensing read line 211, and the pixel data lines 212 are disposed in a same layer. Each of the dummy signal lines 213 is located between the sensing read line 211 and a corresponding one of the pixel data lines 212, and a potential of the dummy signal line 213 is configured to be floating.

It should be noted that, in this embodiment, the dummy signal lines 213 added between the sensing read line 211 and the pixel data lines 212 is equivalent to a shielding structure, which can prevent signals transmitted on the sensing read line 211 and the pixel data line 212 from interfering with each other. In addition, a distance between the sensing read line 211 and the adjacent pixel data line 212 can be increased due to the disposition of the dummy signal line 213, thus reducing the capacitance between the sensing read line 211 and the adjacent pixel data line 112 and effectively improving the signal-to-noise ratio during signal transmission.

Further, please continue to refer to FIG. 4. In this embodiment, the dummy signal lines 213 include a first dummy signal line (not shown) and a second dummy signal line (not shown). The first dummy signal line and the second dummy signal line are symmetrically arranged on both sides of a same one of the sensing read lines 211. It should be noted that such an arrangement can ensure that the capacitances formed by the same sensing read line 211 and the pixel data lines 212 located on both sides of the same sensing read line 211 are equal to each other, thereby ensuring the uniformity of signal transmission and improving the quality of signal transmission.

Further, please continue to refer to FIG. 4. In this embodiment, an orthographic projection of the shielding structure 220 on the substrate 260 further covers an orthographic projection of the dummy signal lines 213 on the substrate 260, and the orthographic projection of the shielding structure 220 on the substrate 260 further covers the orthographic projection of spacings between the dummy signal lines 213 and the sensing read line 211 on the substrate 260. It should be noted that such an arrangement can further improve the coverage of the shielding electric field described above, so that the signal-to-noise ratio during signal transmission can be further improved.

Further, please continue to refer to FIG. 4. In order to ensure the uniformity of signal transmission in the display panel 200, as shown in FIG. 4, in this embodiment, widths of the sensing read line 211, the pixel data lines 212, and the dummy signal lines 213 are equal and are arranged at equal intervals.

It should be understood that, in a modification according to the invention, the sensing read line, the pixel data lines, and the dummy signal lines may be arranged at equal intervals. In addition, widths of the sensing read line, the pixel data lines, and the dummy signal lines are not completely equal. In another modification according to the invention, the sensing read line, the pixel data lines, and the dummy signal lines may not be completely and equally spaced, and the widths of the sensing read line, the pixel data lines, and the dummy signal lines are set to be equal. The present invention is not limited to the above-mentioned features and combinations thereof.

Figure 5:
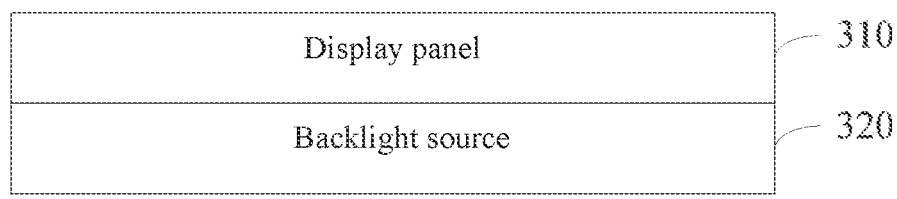
FIG. 5 is a schematic structural diagram of a display device provided in an embodiment of the invention.

Please refer to FIG. 5, which is a schematic structural diagram of a display device 300 provided in an embodiment of the invention. The components and the relative positional relationship of each component in the embodiment according to the present invention can be clearly seen from the figures.

As shown in FIG. 5, the display device 300 includes a display panel 310 and a backlight source 320, wherein the display panel 310 may be the display panel 100 described in the first embodiment above, or may be the display panel 200 described in the second embodiment. The backlight source 320 is connected to the display panel 310 for providing backlight to the display panel 310.

Figure 6:
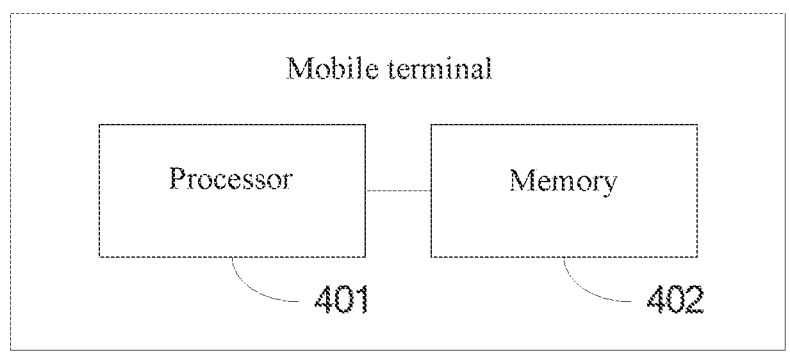
FIG. 6 is a schematic structural diagram of a mobile terminal provided in an embodiment of the invention.

Please refer to FIG. 6, which is a schematic structural diagram of a mobile terminal 400 provided in an embodiment of the invention. The above-mentioned display device 300 is applied to the mobile terminal 400, and the mobile terminal 400 may be a smart phone or a tablet computer, etc. The components and the relative positional relationship of each component of the present invention can be clearly seen from the figures.

As shown in FIG. 6, the mobile terminal 400 includes a processor 401 and a memory 402. Specifically, the processor 401 is electrically connected to the memory 402.

The processor 401 is a control center of the mobile terminal 400. It uses various interfaces and lines to connect the various parts of the entire mobile terminal. By running or loading applications stored in the memory 402, and calling data stored in the memory 402, execute various functions of the mobile terminal and process data, so as to monitor the mobile terminal as a whole.

In addition to the above-described embodiments, the invention may also be implemented in other embodiments. All technical solutions formed by equivalent replacement or equivalent replacement fall within the protection scope required by the invention.

Accordingly, although the present invention has been disclosed as a preferred embodiment, it is not intended to limit the present invention. Those skilled in the art without departing from the scope of the present invention may make various changes or modifications, and thus the scope of the present invention should be after the appended claims and their equivalents.

What is claimed is:

1. A display panel, comprising:
 a substrate comprising a fan-out area;
 a wiring layer disposed on the substrate and located in the fan-out area and at least comprising a sensing read line and a plurality of pixel data lines arranged in a regular manner with the sensing read line, wherein the sensing read line and the plurality of pixel data lines are in a single layer; and
 a shielding structure disposed in a layer different from the sensing read line and the plurality of pixel data lines in the wiring layer, wherein the shielding structure has a floating potential;
 wherein the display panel further comprises a plurality of dummy signal lines disposed in the fan-out area and located between the sensing read line and the plurality of pixel data lines respectively; and
 wherein an orthographic projection of the shielding structure on the substrate covers an orthographic projection of the sensing read line on the substrate, orthographic projections of the plurality of dummy signal lines on the substrate, and orthographic projections of spacings between the plurality of dummy signal lines and the sensing read line on the substrate; the orthographic projection of the shielding structure on the substrate covers none of orthographic projections of the plurality of pixel data lines on the substrate.

2. The display panel of claim 1, wherein potentials of the dummy signal lines are set to be floating.

3. The display panel of claim 2, wherein the dummy signal lines comprise a first dummy signal line and a second dummy signal line, and the first dummy signal line and the second dummy signal line are symmetrically arranged on both sides of the sensing read line.

4. The display panel of claim 2, wherein widths of the sensing read line, the pixel data lines, and the dummy signal lines are equal; and/or
 the sensing read line, the pixel data lines, and the dummy signal lines are arranged at equal intervals.

5. The display panel of claim 2, wherein the dummy signal lines, the sensing read line, and the pixel data lines are disposed in a same layer.

6. The display panel of claim 1, wherein a first distance is defined between the sensing read line and an adjacent one of the pixel data lines, and a second distance is defined between adjacent ones of the pixel data lines, wherein the first distance is greater than the second distance.

7. The display panel of claim 1, wherein a material of the shielding structure comprises metal or metal oxide.

8. The display panel of claim 1, wherein the sensing read line is plural in number and each of the sensing read lines is coupled to a plurality of sensing unit circuits, and each of the pixel data lines is coupled to a plurality of pixel unit circuits, wherein the sensing unit circuits and the pixel unit circuits are arranged in an array in a display area included in the display panel.

9. The display panel of claim 8, wherein each of the sensing unit circuits is configured to change in capacitance in response to a laser touch, and the sensing read line is configured to obtain the change and reflect the change to a corresponding processing circuit, so that where the laser touch is performed is determined.

10. A display device, comprising a display panel and a backlight source, wherein the backlight source is connected to the display panel for providing backlight to the display panel;
 wherein the display panel comprises:
 a substrate comprising a fan-out area;
 a wiring layer disposed on the substrate and located in the fan-out area and at least comprising a sensing read line and a plurality of pixel data lines arranged in a regular manner with the sensing read line, wherein the sensing read line and the plurality of pixel data lines are in a single layer; and
 a shielding structure disposed in a layer different from the sensing read line and the plurality of pixel data lines in the wiring layer, wherein the shielding structure has a floating potential;
 wherein the display panel further comprises a plurality of dummy signal lines disposed in the fan-out area and located between the sensing read line and the plurality of pixel data lines respectively; and
 wherein an orthographic projection of the shielding structure on the substrate covers an orthographic projection of the sensing read line on the substrate, orthographic projections of the plurality of dummy signal lines on the substrate, and orthographic projections of spacings between the plurality of dummy signal lines and the sensing read line on the substrate; the orthographic projection of the shielding structure on the substrate covers none of orthographic projections of the plurality of pixel data lines on the substrate.

11. The display device of claim 10, wherein potentials of the dummy signal lines are set to be floating.

12. The display device of claim 11, wherein the dummy signal lines comprise a first dummy signal line and a second dummy signal line, and the first dummy signal line and the second dummy signal line are symmetrically arranged on both sides of the sensing read line.

13. The display device of claim 11, wherein widths of the sensing read line, the pixel data lines, and the dummy signal lines are equal; and/or
 the sensing read line, the pixel data lines, and the dummy signal lines are arranged at equal intervals.

14. The display device of claim 11, wherein the dummy signal lines, the sensing read line, and the pixel data lines are disposed in a same layer.

15. The display device of claim 10, wherein a material of the shielding structure comprises metal or metal oxide.

16. The display device of claim 10, wherein the sensing read line is plural in number and each of the sensing read lines is coupled to a plurality of sensing unit circuits, and each of the pixel data lines is coupled to a plurality of pixel unit circuits, wherein the sensing unit circuits and the pixel unit circuits are arranged in an array in a display area included in the display panel.

17. The display device of claim 16, wherein each of the sensing unit circuits is configured to change in capacitance in response to a laser touch, and the sensing read line is configured to obtain the change and reflect the change to a corresponding processing circuit, so that where the laser touch is performed is located.

* * * * *